United States Patent [19]

Edinger et al.

[11] 4,307,047
[45] Dec. 22, 1981

[54] METHOD OF MANUFACTURE OF IDENTICAL PARTS DISPLAYING DIFFERENT INDICIA

[75] Inventors: Egon Edinger, Graefelfing; Peter Reiser, Esslingen, both of Fed. Rep. of Germany

[73] Assignee: Siemens Aktiengesellschaft, Berlin & Munich, Fed. Rep. of Germany

[21] Appl. No.: 179,040

[22] Filed: Aug. 18, 1980

[30] Foreign Application Priority Data

Sep. 12, 1979 [DE] Fed. Rep. of Germany ....... 2936926

[51] Int. Cl.³ .............................................. B41M 5/26
[52] U.S. Cl. ............................ 264/25; 219/121 L; 219/121 LM; 264/132; 264/328.18; 425/174.4
[58] Field of Search ............... 264/25, 22, 26, 1, 132, 264/328.18, 1.4; 425/174.4; 219/121 LM, 121 L

[56] References Cited

U.S. PATENT DOCUMENTS

| | | | |
|---|---|---|---|
| 3,266,393 | 8/1966 | Chitayat | 219/121 L |
| 3,443,936 | 5/1969 | Menold | 264/22 |
| 3,506,779 | 4/1970 | Brown et al. | 219/121 LB |
| 3,549,733 | 12/1970 | Caddell | 264/25 |
| 3,651,191 | 3/1972 | Glatt et al. | 264/132 |
| 3,657,510 | 4/1972 | Rothrock | 219/121 LA |
| 3,678,141 | 7/1972 | Metcalfe et al. | 264/73 |
| 4,013,747 | 3/1977 | Hampel | 264/73 |
| 4,037,075 | 7/1977 | Pugsley et al. | 219/121 LM |
| 4,159,414 | 6/1979 | Suh et al. | 219/121 LM |

FOREIGN PATENT DOCUMENTS 2240553 9/1978 Fed. Rep. of Germany.

Primary Examiner—Jeffery R. Thurlow
Attorney, Agent, or Firm—Hill, Van Santen, Steadman, Chiara & Simpson

[57] ABSTRACT

A method of manufacturing parts which are otherwise identical but which display different indicia such as a typewriter or the like keys which comprises the steps of injection molding a plurality of identical parts of a plastic having a filler material capable of undergoing a color change, and thereafter exposing individually the identical parts to a radiation source for changing the color of localized portions of the part to display the indicia while retaining the molded color of remaining portions.

5 Claims, 6 Drawing Figures

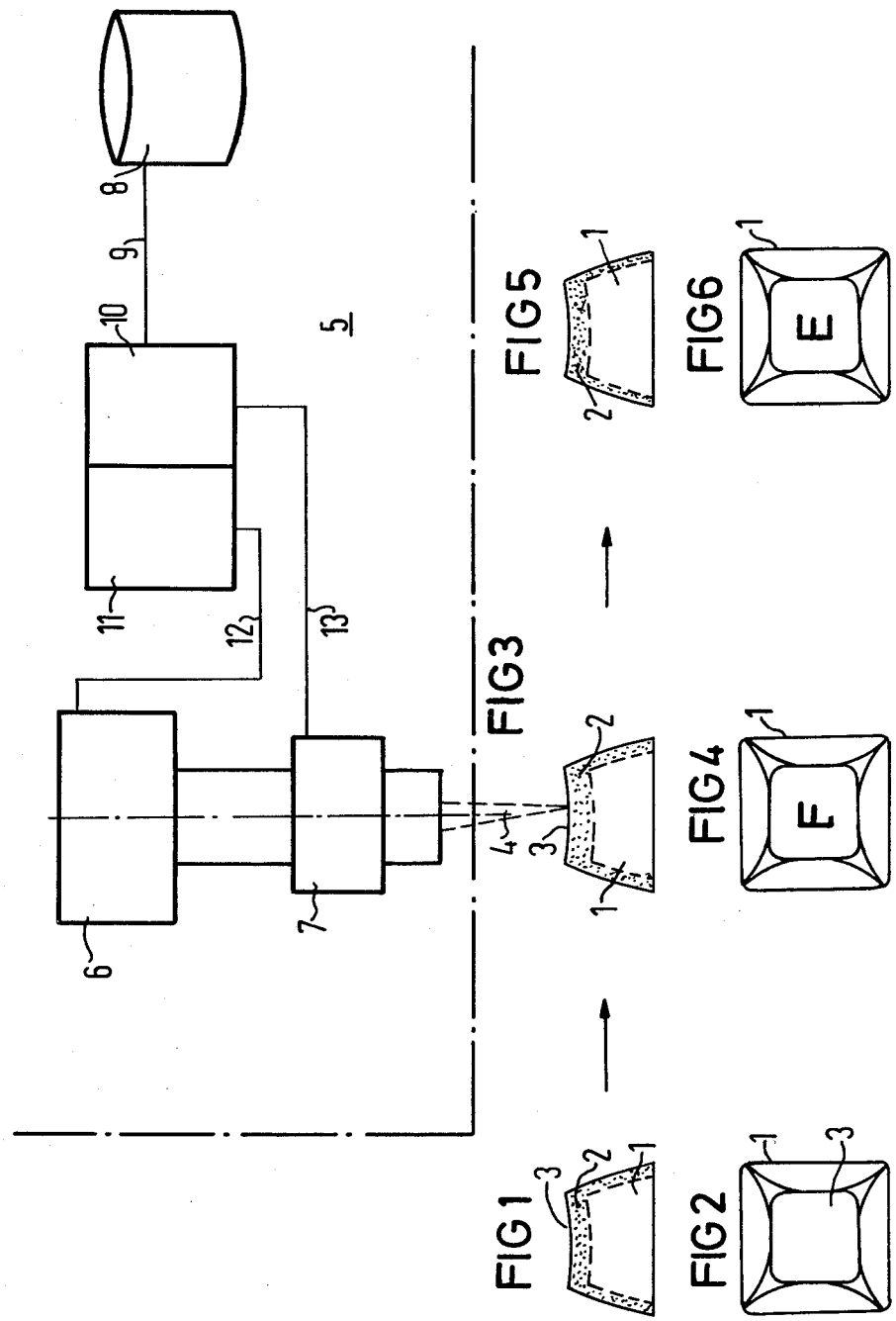

METHOD OF MANUFACTURE OF IDENTICAL PARTS DISPLAYING DIFFERENT INDICIA

BACKGROUND OF THE INVENTION

1. Field of the Invention

This invention relates to methods of production and, more particular, to methods for producing a plurality of similar plastic parts by injection molding and thereafter providing different readable indicia on or within the plastic parts.

2. Prior Art

Although the invention disclosed herein is applicable to a wider range of devices, it is most exemplarly practiced in connection with device keys. Such keys are required for manual input of data and information to corresponding process systems such as, for example, typewriters, calculators, teletypewriters, desk telephone stations, electronic controls, and the like. In the production of such keys, particularly to save tool costs and to be able to quickly fulfill customers' desires, even in the case of rare special symbols or exact scripts or type styles, it is most practical to manufacture uniformly injected injection molded keys with the desired indicia being applied by subsequent operations.

Thus, it has been known in the art to print on surfaces of standard form keys subsequent to their formation. Keys produced in this manner, however, do not possess abrasive resistance such as is usually required. Thus, such keys have a shortened use life. When used in connection with high quality or high use devices, quality standards require that such keys exhibit a longer useful life and high abrasive resistance. The requirements can, at present, only be fulfilled satisfactorily by manufacturing keys with a two color injection molding process. Such manufacture, however, will of course require that a special mold or tool be prepared for each different indicia key. The tool or mold must therefore be stored for relatively long periods of time. Such special tools or molds are both expensive to initially acquire and to store and, moreover, do not represent a satisfactory method of accomodating changing style requirements.

A method for producing graphic symbols on instrument dials positioned within an otherwise closed device and identifyable through an inspection glass or a transparent cap is known, for example, from German Pat. No. 2,240,553. In this method, the surface of the dial is provided with different colored lacquer layers and the top-most layer is burned away by means of a deflectable or controllable laser beam. In this manner, the underlying layer will become visible thus providing the desired indicia. This method is, however, not practical in connection with device keys where the surface must thereafter be subjected to constant use abrasion.

Another method shown, for example, in U.S. Pat. No. 3,266,393, utilizes a laser beam to mark a film by changing the film emulsion characteristic. The shape of the marking to be applied to the film is predetermined by a slotted mask positioned within the path of the laser beam.

Additionally, U.S. Pat. No. 3,657,510 discloses a method of changing the surface of an object through vaporization, heating or chemical reaction under the influence of a laser beam.

It would be an advance in the art to provide an improved method of manufacture of similar plastic parts which are to be provided with different readable indicia by a means other than methods which require the storage of special tools for creating the different indicia parts.

SUMMARY OF THE INVENTION

The above advance in the art is provided by the present invention which utilizes a method of production of identical plastic parts with different indicia where the indicia are provided subsequent to the manufacture of the part.

The plastic of the base material of the part is mixed with a filler which is capable of being changed in color by means of an applied energy radiation. Subsequent to mixture of the plastic-filler mixture, the uniform parts are injection molded through use of a uniform tool such that identically shaped parts are provided. Thereafter, the standard parts are subjected to an energy radiation which is accomodated to the shape of the symbol which is to be applied thereby correspondingly changing the color of the surface of the part at the location of impact by the energy radiation.

This method, when used to produce plastic keys, produces a superior product wherein the indicia inscription, in contrast to printed keys, is a fixed part of the base material such that the resultant product corresponds to the quality standards heretofore experienced in connection with two color injection molded keys.

In practicing the invention the filler mixed with the plastic can, for example, be a coloring powder which responds to heat irradiation. For example, it has been found that a product available from Farber Castel under the trademark "THERMOCOLOR", previously sold as a heat radiation indicator, is an acceptable filler for use in the practice of this invention. Such a filler can, for example, can be an iron oxide-hydroxide with a base material plastic of ABS. Such a composition provides a uniformly injection molded standard part which can be subsequently provided with the desired readable indicia in such a manner than not only can tool costs be significantly reduced but further customer desires can be quickly fulfilled.

It is therefore a principal object of this invention to provide an improved method of manufacturing identically shaped plastic parts having different readable indicia thereon.

It is another, and more particular, objection of this invention to provide a method of producing device keys of identical injection molded plastic parts having different readable indicia formed thereon by treatment subsequent to injection molding.

It is another, and more particular, object of this invention to provide a method of manufacturing a plurality of identically shaped plastic parts and to subsequently provide different readable indicia on the parts, where the parts are manufactured of a base plastic mixed with a color changable filler material, the parts being subjected to an energy radiation source subsequent to molding to change color of selected portions of the part to provide the readable indicia.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a side sectional view of a standard injection molded key form made according to this invention.

FIG. 2 is a top view of the key of FIG. 1.

FIG. 3, which includes the portion of the drawings within the dot-dash line, is a view of a key similar to FIG. 1 undergoing the method step of being subjected to energy radiation.

FIG. 4 is a top plan view of the key of FIG. 3 showing formation of readable indicia.

FIG. 5 is a view similar to FIG. 1 of an injection molded key which has been inscribed by the process of FIG. 3.

FIG. 6 is a top plan view of the key of FIG. 5.

DESCRIPTION OF THE PREFERRED EMBODIMENT

As shown in FIG. 1, a standard injection molded key 1 is formed of a base material plastic having a filler 2 mixed in. FIG. 1 can either be considered as a partially sectional view showing a hollow key constructed of a uniform mixture of filler and plastic or, can be considered as a non-hollow key having a base plastic section and a shell plastic section with the shell plastic section consisting of a mixture of plastic and filler. The filler is indicated by the dots 2. In manufacture, standard injection molding procedures are followed as will be apparent to those skilled in the art and a key having a top surface 3, otherwise undistinguished by indicia, is produced.

The key of FIGS. 1 and 2 is preferably formed of an acrylic-butadiene-styrene (ABS) mixed with from 0.5 to 1.0% by weight filler material. The ABS may be of the type having a chemical-physical characteristics identified by German commercial standard DIN 16772 E. As a filler material, an iron oxide-hydroxide capable of undergoing a color change by splitting off water crystallization during energy impact is used. Particularly, such iron oxide-hydroxides having a conversion from a yellow color to a red-brown color at 260° centigrade are usable.

As shown in FIG. 3, the surface 3 of the injection molded key is subjected to an energy source such as, for example, a deflectable laser beam 4 emminating from a laser inscription system generally designated at 5. In one method of manufacture the laser beam is deflected corresponding to the shape of the letter symbol which is to be applied. Laser systems capable of such deflection are known to the art and include laser beam generating equipment 6 and deflection systems 7. The deflection system 7 is controlled by a program memory 8 through control 10, the memory being graphically illustrated as being in-fed to control 10 thorugh line 9. Control 10 controls the deflection system 7 through line 13 whereas the laser generator 6 is controlled by control 11 through line 12. In such systems, the program memory 8 releases signals corresponding to the desired symbol to the control 10 which correspondingly influences deflection system 7. The laser beam, when striking on different portions of the surface 3 of the key 1, causes the filler material in the plastic to change in color.

The laser utilized can, preferably, be a neodymium-yag laser having a wave length of 1020 nm with a corresponding power of 50 watts in continuous operation. However, preferably an impulse operatable laser will be used driven at a pulse frequency of 1.5 to 2.5 kilohertz at approximately half power.

While being subjected to the laser, as shown in FIG. 4, the surface 3 of the standard formed key will be provided with the respective desired indicia, in this case the E.

FIGS. 5 and 6 show the completed key having the fully formed indicia.

In other embodiments, in place of the laser beam, an electron beam can also be used. Further, x-ray beams may also be used in which case the radiation will be directed to the proper surface area by means of a slotted mask.

Additionally, in place of a deflectable laser beam, a fixed laser can be utilized where the key 1 is moved in reference to a fixed beam. Relative movement between the beam and the key can be under the control of a process computer such that the desired symbols and their positioning can be fed to the process computer by standard means such as, for example, punched tape.

It should be appreciated that the above method can be practiced with keys made wholly with mixtures of base plastic and filler or with keys having only portions of the key formed of the mixture of base plastic and filler with the remaining portions of the key being formed of the base plastic alone. In the latter instance, filler costs can be reduced.

It can therefore be seen from the above that this invention provides a method of producing standard injection molded identical plastic parts with the parts having different indicia, the indicia being provided by a process subsequent to the molding, but with the indicia showing as an integral part of the molded part rather than being added on by means such as printing. In practicing the invention the color of selected areas of the finished molded plastic part is changed so as to distinguish those areas from adjacent areas. By controlling the shape of the color changed areas, any desired indicia can be provided.

Although the teachings of our invention have herein been discussed with reference to specific theories and embodiments, it is to be understood that these are by way of illustration only and that others may wish to utilize my invention in different designs or applications.

We claim as our invention:

1. The method of producing identically shaped plastic keys having different readible indicia on a surface thereof which comprises the steps of preparing a mixture of a base plastics material and a filler material, the filler material capable of undergoing a color change by application of energy, molding the keys by injection molding with at least a surface portion of the key formed of the mixture, providing a laser beam, focusing the energy radiation in the beam, moving the key surface and beam with respect to one another in a predetermined pattern whereby the beam plays over the surface in a path corresponding to the desired readible indicia, the beam having a power sufficient to change the color of the filler material in the path area.

2. The method of claim 1 wherein the base plastics material is ABS and the filler is an iron oxide-hydroxide.

3. The method of claim 1 wherein the mixture forms only a portion of the key including said surface with the remaining portions of the key formed by the base plastic alone.

4. The method of claim 3 wherein the mixture includes 0.5 to 1.0 percent by weight filler material.

5. The method of claim 4 wherein the laser beam is moved with respect to a stationary key surface.

* * * * *